United States Patent
Shinohara et al.

(10) Patent No.: US 8,832,517 B2
(45) Date of Patent: Sep. 9, 2014

(54) DATA RETRANSMISSION METHOD AND WIRELESS COMMUNICATION APPARATUS

(71) Applicant: Fujitsu Limited, Kawasaki (JP)

(72) Inventors: Chiaki Shinohara, Fukuoka (JP);
Kazuhisa Obuchi, Kawasaki (JP);
Masaaki Suzuki, Kawasaki (JP);
Akihide Otonari, Fukuoka (JP);
Yoshinori Soejima, Fukuoka (JP); Miki Yamasaki, Fukuoka (JP); Shinya Okamoto, Fukuoka (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/936,723

(22) Filed: Jul. 8, 2013

(65) Prior Publication Data

US 2013/0297982 A1 Nov. 7, 2013

Related U.S. Application Data

(63) Continuation of application No. 12/330,159, filed on Dec. 8, 2008, now Pat. No. 8,516,324.

(30) Foreign Application Priority Data

Dec. 28, 2007 (JP) ................. 2007-339450

(51) Int. Cl.
| | |
|---|---|
| G06F 11/00 | (2006.01) |
| H04L 1/00 | (2006.01) |
| H04W 24/04 | (2009.01) |
| H04L 1/18 | (2006.01) |
| H04L 1/16 | (2006.01) |

(52) U.S. Cl.
CPC ............ *H04W 24/04* (2013.01); *H04L 1/0073* (2013.01); *H04L 1/1848* (2013.01); *H04L 1/1838* (2013.01); *H04L 1/1812* (2013.01); *H04L 1/1678* (2013.01)
USPC .......................................... 714/748; 714/749

(58) Field of Classification Search
USPC .......................................... 714/748, 749, 751
See application file for complete search history.

(56) References Cited

U.S. PATENT DOCUMENTS

| | | | |
|---|---|---|---|
| 6,088,342 A | 7/2000 | Cheng et al. | |
| 6,845,089 B1 | 1/2005 | Gu et al. | |

(Continued)

FOREIGN PATENT DOCUMENTS

| | | |
|---|---|---|
| EP | 1545040 | 6/2005 |
| EP | 1742432 | 1/2007 |

(Continued)

OTHER PUBLICATIONS

Japanese Patent Office "Notice of Rejection" dated Nov. 24, 2009 with English translation attached and Japanese Patent Office "Decision of Rejection" dated Mar. 6, 2010 with English translation attached, for corresponding Japanese Patent Application No. 2007-339450.

(Continued)

*Primary Examiner* — Marc Duncan
(74) *Attorney, Agent, or Firm* — Myers Wolin, LLC

(57) ABSTRACT

A method for retransmission data for a data transmission system in which a receiver transmits, when receiving data, a transmittal confirmation signal indicating whether the data is correctly received or not, and a transmitter refers to the transmittal confirmation signal and retransmits, when confirming that the data is not correctly received in the receiver, the data to the receiver, the method includes: at the transmitter, holding the transmitted data; keeping the holding of the transmitted data even after the transmitter confirms that the data is correctly received in the receiver by referring to the transmittal confirmation signal corresponding to the data and retransmitting, to the receiver, the data held therein in response to a request for retransmission of the data from the receiver.

1 Claim, 11 Drawing Sheets

VIEW ILLUSTRATING PROCESS FLOW OF EMBODIMENT

(56) References Cited

U.S. PATENT DOCUMENTS

| | | | |
|---|---|---|---|
| 6,956,855 | B1 | 10/2005 | Chang |
| 7,046,642 | B1 | 5/2006 | Cheng et al. |
| 8,024,634 | B2* | 9/2011 | Schmidt et al. ............... 714/748 |
| 8,516,324 | B2* | 8/2013 | Shinohara et al. ............ 714/748 |
| 2005/0251721 | A1* | 11/2005 | Ramesh et al. ............... 714/748 |
| 2006/0187870 | A1 | 8/2006 | Zhu et al. |
| 2006/0282739 | A1* | 12/2006 | Meyer et al. .................. 714/748 |
| 2006/0292992 | A1* | 12/2006 | Tajima et al. .............. 455/67.11 |
| 2007/0006317 | A1 | 1/2007 | Asami et al. |
| 2007/0008990 | A1 | 1/2007 | Torsner |
| 2007/0089037 | A1 | 4/2007 | Jiang |
| 2007/0168826 | A1* | 7/2007 | Terry et al. .................... 714/748 |
| 2007/0168827 | A1 | 7/2007 | Lohr et al. |
| 2007/0280193 | A1* | 12/2007 | Kim et al. ...................... 370/349 |
| 2007/0288824 | A1 | 12/2007 | Yeo et al. |
| 2008/0032725 | A1 | 2/2008 | Usuda et al. |
| 2008/0212541 | A1* | 9/2008 | Vayanos et al. ............... 370/335 |
| 2008/0310333 | A1* | 12/2008 | Balachandran et al. ...... 370/310 |
| 2009/0092085 | A1* | 4/2009 | Ramesh et al. ............... 370/329 |
| 2010/0275087 | A1* | 10/2010 | Doppler et al. ............... 714/749 |

FOREIGN PATENT DOCUMENTS

| | | |
|---|---|---|
| EP | 1821446 | 8/2007 |
| EP | 1871033 | 12/2007 |
| JP | HEI 5-91091 | 4/1993 |
| JP | HEI 5-207098 | 8/1993 |
| JP | HEI 10-341488 | 12/1998 |
| JP | 2000-513552 | 10/2000 |
| JP | 2003-507928 | 2/2003 |
| JP | 2006-270788 | 10/2006 |
| JP | 2006-523042 | 10/2006 |
| JP | 2007-13877 | 1/2007 |
| JP | 20070168827 | 5/2007 |
| KR | 10-2007-0015354 | 2/2007 |
| TW | 200723751 | 6/2007 |
| WO | 99/53631 | 10/1999 |
| WO | 2005/125259 | 12/2005 |
| WO | 2006/126960 | 11/2006 |
| WO | 2007/109256 | 9/2007 |
| WO | 2007/116280 | 10/2007 |

OTHER PUBLICATIONS

The State Intellectual Property Office of China "First Notification of Office Action" issued for corresponding Chinese Patent Application No. 10-200810185038.5, mailed Issued Apr. 25, 2011. English translation attached.

Panasonic; "UL HARQ behaviour with dynamic adaptive/non-adaptive operation"; R1-074928 (R2-074854); 3GPP TSG-RAN WG1 Meeting #51; Jeju, Korea, Nov. 5-9, 2007.

Office Action issued for corresponding Taiwan Patent Application No. 97148181 issued Mar. 29, 2013 with English translation.

Extended European Search Report for corresponding European Patent Application No. 08171978.3, dated Mar. 9, 2010.

3GPP TSG-RAN WG1 Meeting #51; Jeju,Korea, Nov. 5-9, 2007; R1-074928 (R2-074854); Source: Panasonic; Title: "UL HARQ behaviour with dynamic adaptive/non-adaptive operation"; Agenda Item: 6.4.6; Document for: Discussion and Decision; Mobile Competence Centre; 650, Route Des Lucioles; F-06921 Sophia-Antipolis Cedex; France; vol. RAN WG1, No. Korea; Oct. 31, 2007.

Australian Government/IP Australia Examiner's First Report on corresponding Australian Patent Application No. 2008258146, dated Mar. 5, 2010.

Korean Intellectual Property Office "Notice of Preliminary Rejection" for corresponding Korean Patent Application No. 10-2008-125850, mailed Jul. 23, 2010. English translation attached.

3GPP TS 36.321 V2.0.0 (Nov. 2011); 3rd Generation Partnership Project; Technical Specification Group Radio Access Network; "Evolved Universal Terrestrial Radio Access (E-UTRA) Medium Access Control (MAC) protocol specification"; (Release 8); Dated Nov. 2007. [Ref.: KROA mailed Jul. 23, 2010].

3GPPTS36.300 V8.2.0 (Sep. 2007) Technical Specification. 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 8).

3GPPTS36.211 V8.0.0 (Sep. 2007) Technical Specification. 3rd Generation Partnership Project; Technical Specification Group Radio Access Network; Evolved Universal Terrestrial Radio Access (E-UTRA); Physical channels and modulation. (Release 8).

Non-Final Office Action issued by the United States Patent and Trademark Office for corresponding U.S. Appl. No. 12/330,159, on Dec. 14, 2011.

Final Office Action issued by the United States Patent and Trademark Office for corresponding U.S. Appl. No. 12/330,159, on Feb. 6, 2012.

Non-Final Office Action issued by the United States Patent and Trademark Office for corresponding U.S. Appl. No. 12/330,159, on May 8, 2012.

Final Office Action issued by the United States Patent and Trademark Office for corresponding U.S. Appl. No. 12/330,159, on Sep. 19, 2012.

Non-Final Office Action issued by the United States Patent and Trademark Office for corresponding U.S. Appl. No. 12/330,159, on Jan. 23, 2013.

Notice of Rejection issued for corresponding Japanese Patent Application No. 2012-042351, dispatched Jul. 30, 2013, with full English translation.

Non-Final Office Action issued by the United States Patent and Trademark Office for corresponding U.S. Appl. No. 13/936,704, issued Sep. 19, 2013.

* cited by examiner

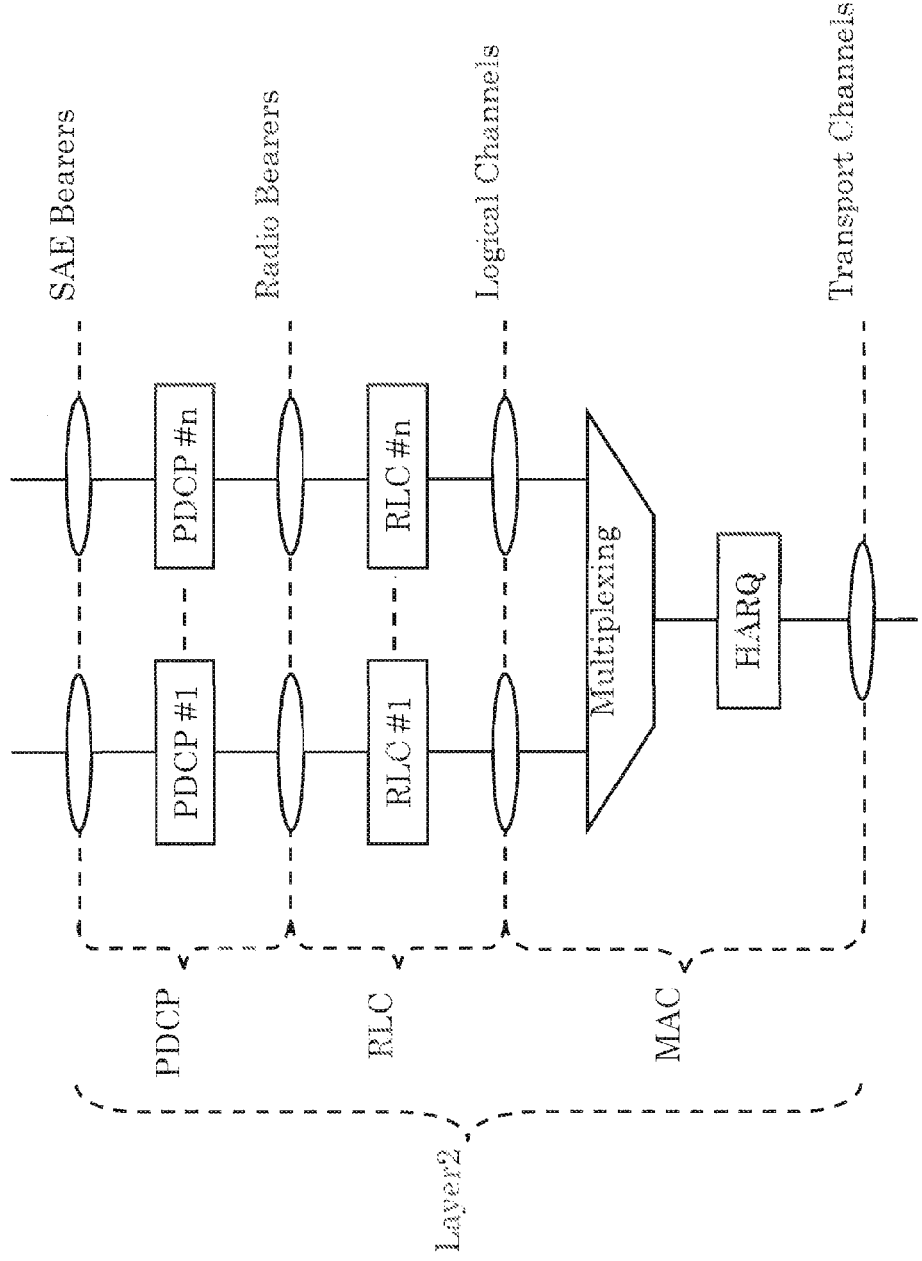

FIG. 2A
VIEW ILLUSTRATING SIGNAL AND INFORMATION CONTENTS

| CH NAME | SIGNAL NAME | LINK | EXISTENCE OR NONEXISTENCE OF CRC PROTECTION | TRANSMISSION TIMING | INFORMATION REGARDING HARQ | CONTENTS |
|---|---|---|---|---|---|---|
| PHICH | HARQ RECEPTION RESULT SIGNAL | DOWNLINK SIGNAL | NONE | RETURN RECEPTION RESULT BY ACK AND NACK WHEN RECEIVING DATA BY HARQ | ACK | REQUEST NEW DATA |
|  |  |  |  |  | NACK | REQUEST RETRANSMISSION DATA |
| PDCCH | TRANSMISSION RESOURCE NOTIFYING SIGNAL | DOWNLINK SIGNAL | EXIST | TRANSMIT WHEN THERE IS DATA IN UE AND WHEN PERMITTING DATA TRANSMISSION OF UE TRANSMIT RESULT OF HARQ BY TRANSMISSION AND RETRANSMISSION | TRANSMISSION (TRANS.) | REQUEST NEW DATA |
|  |  |  |  |  | RETRANSMISSION (RETRANS.) | REQUEST RETRANSMISSION DATA |
| PUCCH | HARQ RECEPTION RESULT SIGNAL | UPLINK SIGNAL | NONE | RETURN RECEPTION RESULT BY ACK AND NACK WHEN RECEIVING DATA BY HARQ | ACK | REQUEST NEW DATA |
|  |  |  |  |  | NACK | REQUEST RETRANSMISSION DATA |

FIG. 2B

| NO. | PHICH AND PUCCH DETECTED BY UE | PDCCH DETECTED BY UE | OPERATION OF UE |
|---|---|---|---|
| 1 | ACK | TRANSMISSION | TRANSMIT NEW DATA ACCORDING TO PDCCH |
| 2 | NACK | TRANSMISSION | TRANSMIT NEW DATA ACCORDING TO PDCCH |
| 3 | ACK | RETRANSMISSION | RETRANSMIT ACCORDING TO PDCCH |
| 4 | NACK | RETRANSMISSION | RETRANSMIT ACCORDING TO PDCCH |
| 5 | ACK | NOT YET RECEIVED | NOT RETRANSMIT, SAVE DATA |
| 6 | NACK | NOT YET RECEIVED | RETRANSMIT (NON-ADAPTIVE) |

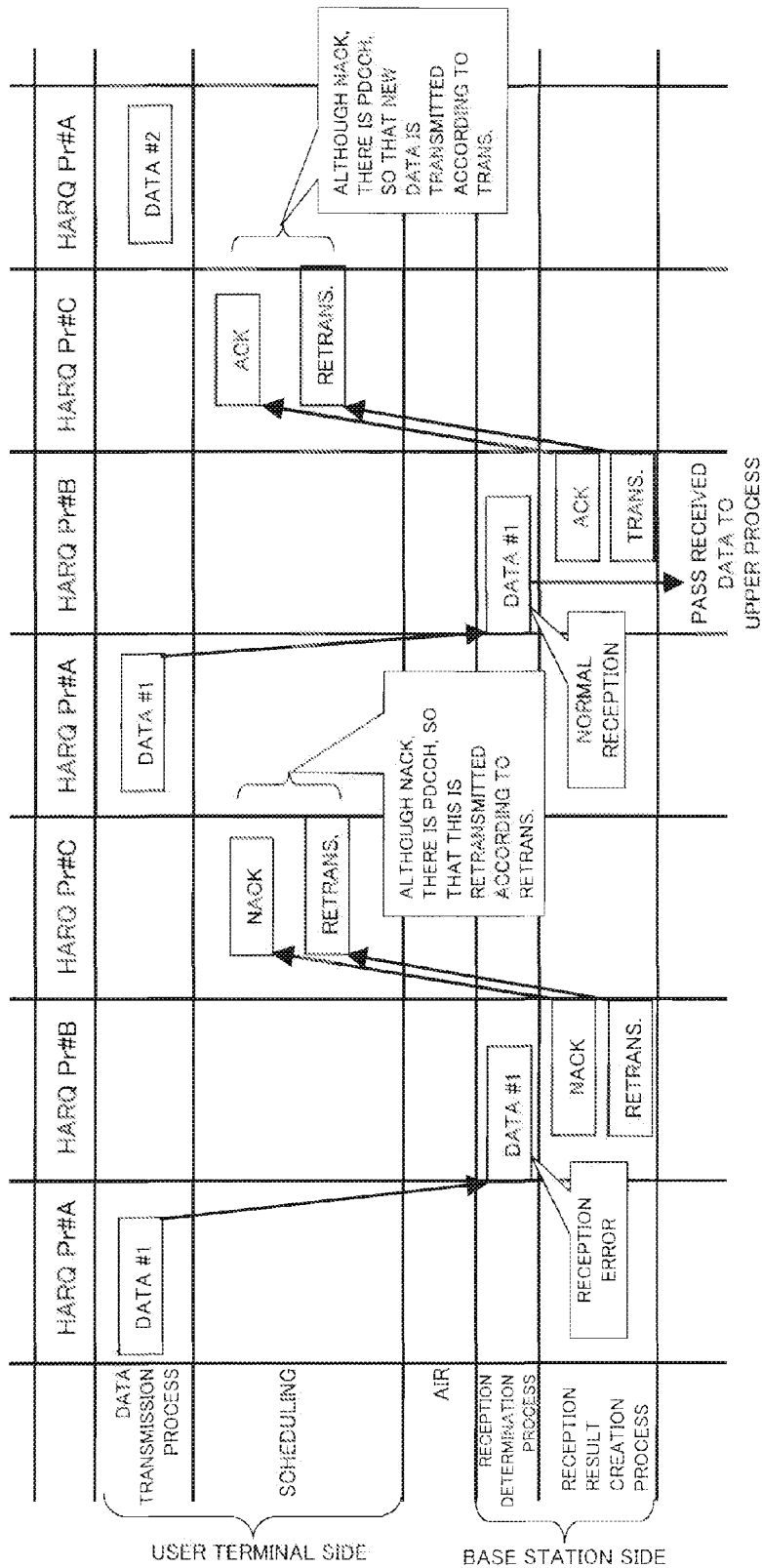

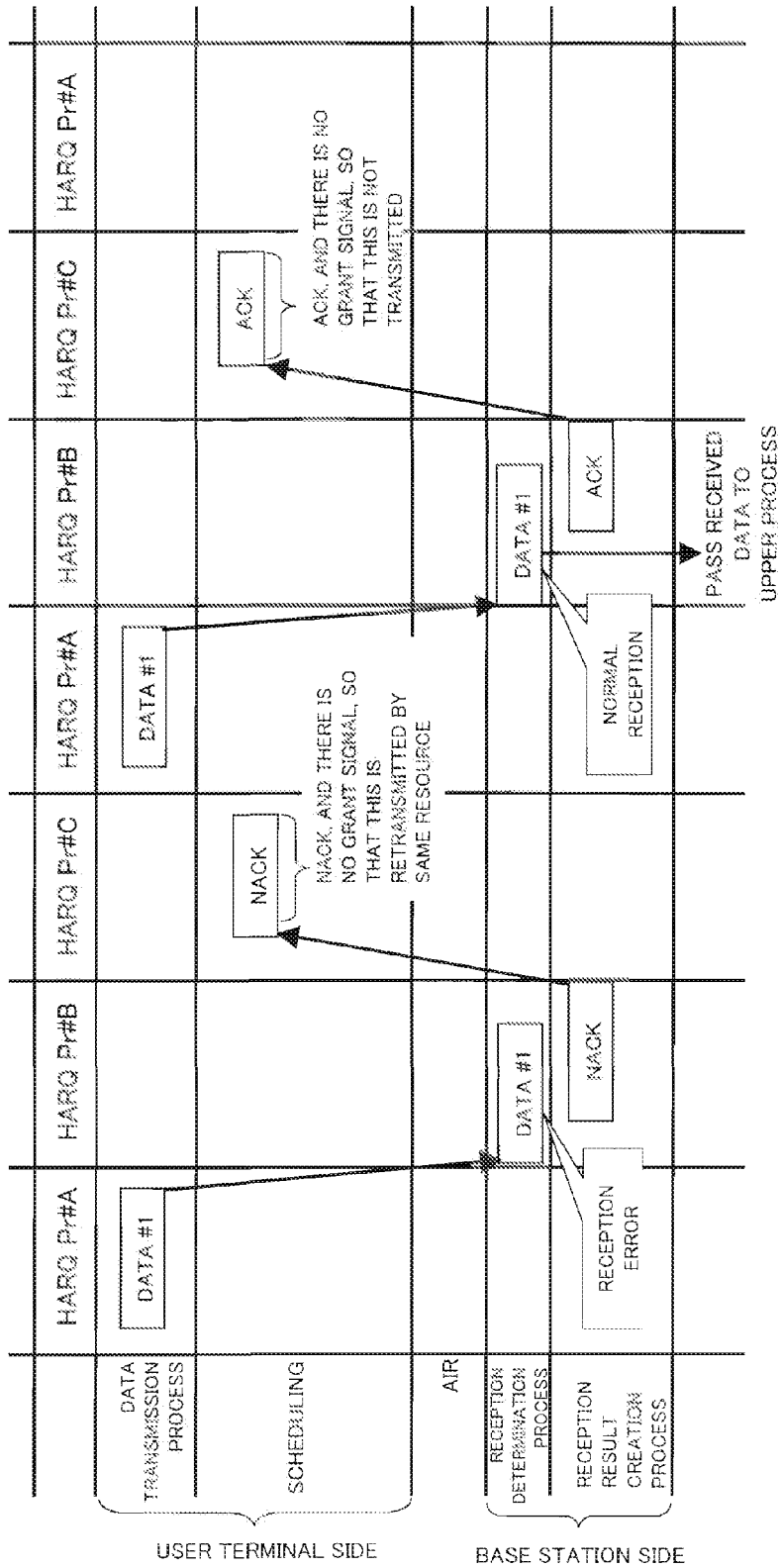

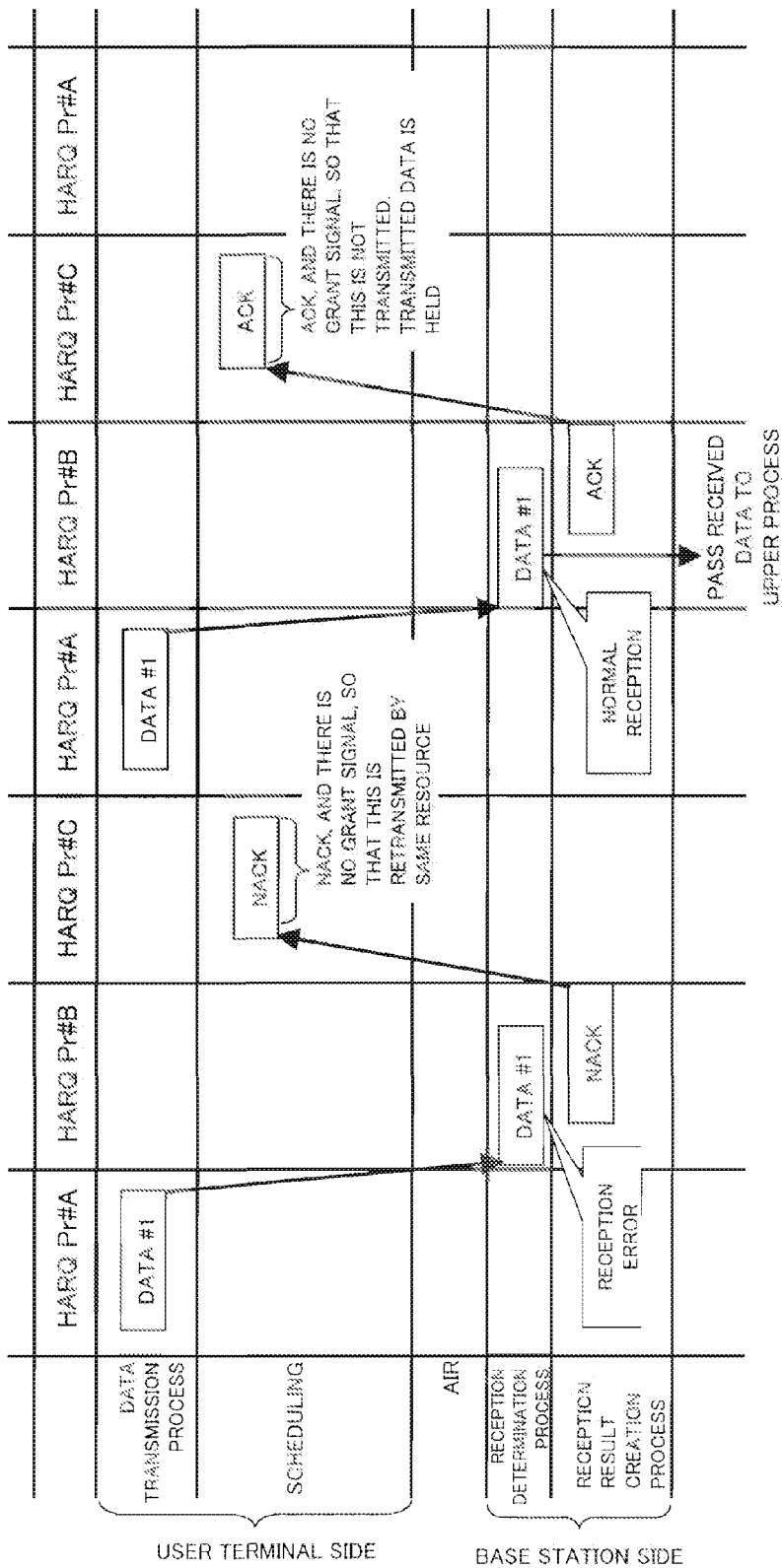

VIEW ILLUSTRATING PROBLEM IN CONVENTIONAL ART

VIEW ILLUSTRATING SUBSTANTIAL PART OF EMBODIMENT

VIEW ILLUSTRATING NORMAL PROCESS FLOW

VIEW ILLUSTRATING PROCESS FLOW EXAMPLE OF CORRECTNESS AND
INCORRECTNESS DETERMINATION OF RECEIVED DATA

VIEW ILLUSTRATING PROCESS FLOW OF EMBODIMENT

VIEW ILLUSTRATING PROCESS FLOW OF EMBODIMENT

DATA RETRANSMISSION METHOD AND WIRELESS COMMUNICATION APPARATUS

CROSS-REFERENCE TO RELATED APPLICATION(S)

This application is a continuation of U.S. application Ser. No. 12/330,159, filed Dec. 8, 2008, now pending, which is based upon and claims the benefit of priority of the prior Japanese Application No. 2007-339450, filed on Dec. 28, 2007, the entire contents of each are hereby incorporated by reference.

FIELD

The embodiment(s) discussed herein is directed to a data retransmission method for retransmitting a data using a wireless communication and a wireless communication apparatus. For example, the embodiment(s) may be employed for a wireless communication system.

BACKGROUND

In the following description, a case in which the wireless communication system includes abase station and a user terminal is described as an example. In this example, a link from the base station to the user terminal, and a link from the user terminal to the base station are referred to as a downlink and an uplink, respectively. A transmission signal from the base station to the user terminal and a transmission signal from the user terminal to the base station are referred to as a downlink signal and an uplink signal, respectively.

Recently, a protocol of the wireless communication system referred to as 3rd generation (3G) is widely adopted.

Japanese Laid-Open Patent Publication No. 2007-124682 discusses the packet communication of the wireless communication apparatus in which the transmission entity receives the feedback message from the reception entity of the communication destination, and transmits the retransmission data packet when the reception is not successful. The reception entity of the communication destination performs soft synthesis of the previously received packet and the retransmitted packet.

The 3G has some stages in development, and a portable phone adopting a protocol referred to as 3.5G or a High-Speed Downlink Packet Access (HSDPA) with further higher communication speed in addition to an original 3G adopted in FOMA™ or the like appears, and further, the protocol referred to as Super3G or 3.9G is considered. The protocol in the wireless communication system of the 3G group is divided into a plurality of layers, and a layer 1 thereof is a layer referred to as a physical layer, and this is a part that assumes actual communication.

A layer 2 is formed in a superior portion of the layer 1. This layer 2 is formed of three sub-layers. The three sub-layers are a Medium Access Control (MAC), a Radio Link Control protocol (RLC), and a Packet-Data Convergence Protocol (PDCP). FIG. 1 illustrates a configuration diagram of the layer 2 of the Super3G protocol. PDCP entities and RLC entities as many as the number of Logical Channels (LCH) to be used are formed. Each LCH transmits and receives each Protocol Data Unit (PDU). A MAC entity allocates resource to each RLC entity. Also, the MAC entity binds RLC-PDU transferred from each RLC entity to one PDU by multiplexing, and transfers the PDU to a Hybrid Automatic Repeat-reQuest (HARQ) processing unit. The HARQ processing unit uses Stop&Wait for performing retransmission control by Acknowledgement/Negative Acknowledgement (ACK/NACK) to perform retransmission control in order to perform retransmission for a PDU retransmission request from the receiving side. Herein, one block of processing functions arranged in one layer or one sub-layer is referred to as an entity.

In the Super3G protocol, the signal relating to the above-described retransmission control and an operation on the receiving side (UE: User Equipment) or the like are illustrated in FIGS. 2A and 2B.

FIG. 2A is a view illustrating a name of channel to be used by the signal, a name of signal, a link indicating in which of the uplink and downlink the signal is used, existence or non-existence of Cyclic Redundancy Check (CRC) protection, a transmission timing at which the signal is transmitted, information, which each signal has regarding the HARQ, and contents of the information. FIG. 2B is a view illustrating information contents when detecting Physical Hybrid ARQ Indicator Channel (PHICH) and Physical Uplink Control Channel (PUCCH) and when detecting Physical Downlink Control Channel (PDCCH), which are signals (represented by channel names) in FIG. 2A, on the UE side, and the operation on the UE side based on the signals. For example, when the UE obtains ACK information in the PHICH and obtains transmission information in the PDCCH, which is the combination No. 1 in FIG. 2B, the PDU next to the previously transmitted PDU is transmitted by the UE side based on the PDCCH.

As illustrated in FIG. 2A, the retransmission request signals performed by the retransmission control by the HARQ processing unit in the uplink and in the downlink are different from each other. In a case of the uplink, error correction process and CRC data are added to the data to be transmitted to the base station to perform the transmission process. The HARQ processing unit on an opposing side (that is to say, the base station side) returns NACK information to the opposing side (that is to say, the user terminal side) when the reception information indicates reception NG (CRC NG: that is to say, when it is determined that the data is incorrect as a result of check using the CRC information). The HARQ processing unit transmits the ACK information to the opposing side (user terminal side) when the reception information indicates reception OK (CRC OK: that is to say, when it is determined that the data is correct as the result of the check using the CRC information).

FIG. 3 is a view illustrating the communication between the conventional user terminal and base station and each operation. FIG. 3 is a view more illustrating a case in which data to be sequentially transmitted such as data #1 and data #2 are on the user terminal side. In FIG. 3, HARQ Pr#A and the like are obtained by separating transition in time in the communication between the user terminal and the base station in process units. First, the data #1 is transmitted from the user terminal side, and this data #1 is received by the base station side through AIR. When reception error occurs at the time of receiving the data #1, the base station side notifies the user terminal side of the NACK information and retransmission information by an HARQ reception result signal and a transmission resource notifying signal using the PHICH and the PDCCH (corresponding to a combination No. 4 in FIG. 2B). The user terminal side transmits again the data #1 to the base station side, according to the retransmission information. By the retransmission, when the data #1 is normally received by the base station side, the base station side notifies the user terminal side of the ACK information and the transmission information by the HARQ reception result signal and the transmission resource notifying signal (corresponding to the combination No. 1 in FIG. 2B). The user terminal side transmits new data #2 to the base station side according to the transmission information.

FIG. 4 is a view illustrating communication between the conventional user terminal and base station and each operation. This is different from the example illustrated in FIG. 3 in that this is a case in which only the ACK information and the NACK information are transmitted, the transmission resource notifying signal is not transmitted from the base station side, and there is no data to be transmitted next to the data #1 on the user terminal side. As in the case illustrated in FIG. 3, when the reception error occurs at the time of receiving the data #1 on the base station side, the NACK information is transmitted from the base station side to the user terminal side. Herein, since the transmission resource notifying signal protected by the CRC is not added, the user terminal side retransmits the data #1 based on the NACK information. When the base station side normally receives the data #1, the data #1 is passed to a superior processing unit. On the other hand, the ACK information is transmitted to the user terminal side so as to notify the normal reception, and the user terminal side holds the transmitted data #1 without retransmitting the same.

FIG. 5 is a view illustrating the communication between the conventional user terminal and base station and each operation. FIG. 5 is a view more illustrating a case in which the data #1 is transmitted from the base station side to the user terminal side. In this case also, when the reception error occurs to the data #1 from the base station side, the user terminal transmits the NACK information to the base station. The base station side retransmits the data #1 according to the NACK information, and when the NACK information is normally received by the user terminal side, the user terminal side transmits the ACK information to the base station side (refer to FIG. 2A, PUCCH), and the base station side holds the transmitted data #1 without retransmitting the same.

As described above, in a case that the data to be transmitted still remains in the user terminal or the base station on the transmitting side and it is possible to allocate the data to the resource (size of the MAC PDU), the transmission resource notifying signal is transmitted to the user terminal side. The transmission resource notifying signal is protected by a CRC code, and reliability thereof is higher than that of the ACK signal and the NACK signal, which are the HARQ reception result signals described above. The base station side adds the transmission information to the transmission resource notifying signal when reception is OK and a new PDU is requested to the user terminal side. The base station side adds the retransmission information to the transmission resource notifying signals and transmits the signals to the user terminal side when retransmission is requested to the user terminal side (refer to drawing illustrating signal in FIG. 2, and refer to FIG. 3).

When the user terminal or the base station on the transmitting side receives only the signal from the PHICH, the user terminal or the base station on the transmitting side retransmits the object PDU to the base station side when the signal is the NACK information, and saves the data without retransmission the same when this is the ACK information (refer to FIG. 4).

When the transmission side receives the signal from the PHICH and the PDCCH, based on the information of the highly reliable PDCCH, in a case that a transmission resource signal is the retransmission information, the retransmission of the object PDU is performed, and in a case that this is the transmission information, the transmission of the new PDU is performed (refer to No. 1 to No. 4 in FIG. 2B and FIG. 3).

Although an operation in the downlink is substantially the same with that of the uplink, there is no signal protected by the CRC corresponding to the transmission resource notifying signal, so that the request of the new PDU and the retransmission request are performed only with the HARQ reception result signal.

[Patent Document 1] Japanese Laid-Open Patent Publication No. 2007-124682

As described above, since the HARQ reception result signal transmitted from the receiving side to the opposing side is not protected by the CRC and a check bit, the ACK information transmitted from the receiving side might change to the NACK information, and on the other hand, the NACK information might change to the ACK information due to the effect of the noise or the like. In a case of the uplink, when there is still the data to be transmitted in the UE (transmitting side) and it is possible to allocate the resource, it is possible to transmit the transmission resource notifying signal protected by the CRC, and correctly determine whether this is the request of the new PDU or the retransmission of the PDU by the transmission information and the retransmission information included in the signal. However, when the HARQ reception result signal is not protected and the NACK information changes to the ACK information, the user terminal or the base station on the receiving side may not correctly receive the NACK information, so that the user terminal or the base station on the transmitting side, which determines that the ACK information is received, does not perform the retransmission even though the retransmission request is transmitted. Therefore, in the user terminal or the base station on the transmitting side, which transmits the NACK information, the MAC processing unit cannot receive the PDU data, and the retransmission is not performed until the retransmission request is transmitted by the retransmission control by the RLC entity, which is in a superior portion of the MAC entity.

This process is described in more detail with reference to FIG. 6. This example illustrates a case in which there is no data to be transmitted next to the data #1. When the data #1 is transmitted from the user terminal side to the base station side, in a case that the reception error occurs to data #1, the NACK information is transmitted from the base station side to the user terminal side. The transmission data changes before the NACK information reaches the user terminal side (indicated as error), and when the transmission data is received as the ACK information by the user terminal side, the user terminal side recognizes that the transmitted data #1 is normally received on the base station side, and there is no Grant signal (for example, the transmission signal and the Retransmission signal), so that the user terminal side does not perform the transmission and stands by while holding the data #1. On the other hand, on the base station side, even though the NACK information is transmitted, the data #1 is not retransmitted.

SUMMARY

According to an aspect of the embodiment, a method includes a data retransmission method for retransmitting a data using a wireless communication, the method including:
on a receiving apparatus (a wireless communication apparatus on a receiving side),
receiving data transmitted from a transmitting apparatus (a wireless communication apparatus on a transmitting side);
determining whether the received data is correct or not;
transmitting data including information indicating that the received data is received correctly to the transmitting apparatus upon being determined the received data is correct, and transmitting data including information indicating that the received data is not received correctly to the transmitting apparatus upon being determined the received data is not correct;

measuring an elapsed time from transmission of the data including information indicating that the received data is not received correctly; and monitoring whether to receive data corresponding to the received data from the transmitting apparatus before the elapsed time reaches a predetermined time.

(2) According to an aspect of the embodiment, an apparatus includes a wireless communication apparatus including:

a receiving unit that receives data transmitted from a transmitting apparatus;

a determining unit that determines whether the data received by the receiving unit is correct or not;

a transmitting unit that transmits data including information indicating that the received data is received correctly to the transmitting apparatus upon the received data being determined to be correct by the determining unit, and transmits data including information indicating that the received data is not received correctly to the transmitting apparatus upon the transmitted data being determined to be incorrect by the determining unit;

a measuring unit that measures an elapsed time from a time at which the transmitting unit transmits the data including information indicating that the received data is not received correctly; and a monitoring unit that monitors whether to receive or not data corresponding to the received data from the transmitting apparatus before the elapsed time measured by the measuring unit reaches a predetermined time.

(3) According to an aspect of the embodiment, a method includes a data retransmission method for retransmitting a data using a wireless communication, the method including:

a step of receiving the data transmitted from a wireless communication unit of transmission side;

a step of maintaining a data corresponding to the data transmitted from the wireless communication of transmission side;

a step of transmitting the data corresponding to the transmitted data maintaining at the wireless communication device of the transmission side to the wireless communication device of reception side when the wireless communication of transmission side received a data showing that the received side did not receive the data transmitted from the wireless communication device of transmission side after the wireless communication device of transmission side had received a message showed that the wireless communication device of reception side received rightly the data transmitted from the wireless communication device of transmission side.

(4) According to an aspect of the embodiment, an apparatus includes a data retransmission method for retransmitting a data using a wireless communication, the method including:

receives a data transmitted from a wireless communication of transmission side at a wireless communication device of reception side;

maintains the data to be transmitted from the wireless communication of transmission side at the wireless communication device of transmission side; and transmits the transmitted data maintaining at the wireless communication device of transmission side to the wireless communication device of reception side at the wireless communication of transmission side when the wireless communication of transmission side received a data showing that the wireless communication of reception side did not receive the data transmitted from the wireless communication device of transmission side after the wireless communication device of transmission side had received a message showed that the wireless communication device of reception side received rightly the data transmitted from the wireless communication device of transmission side.

The object and advantage of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 1 is a view illustrating a protocol construction of a layer 2;

FIG. 2A and FIG. 2B are views illustrating a signal and information contents;

FIG. 3 is a view illustrating communication between user terminal and base station and each operation;

FIG. 4 is a view illustrating the communication between the user terminal and base station and each operation;

FIG. 5 is a view illustrating the communication between the user terminal and base station and each operation;

DESCRIPTION OF EMBODIMENT(S)

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

An embodiment of a data retransmission method for retransmitting a data using a wireless communication and a wireless communication apparatus are described with reference to FIGS. 7 to 11. In the description of this embodiment, a wireless portable terminal, which is a user terminal, is described as the wireless communication apparatus; however, the present invention is not limited to the application to this wireless portable terminal.

Figure 7:
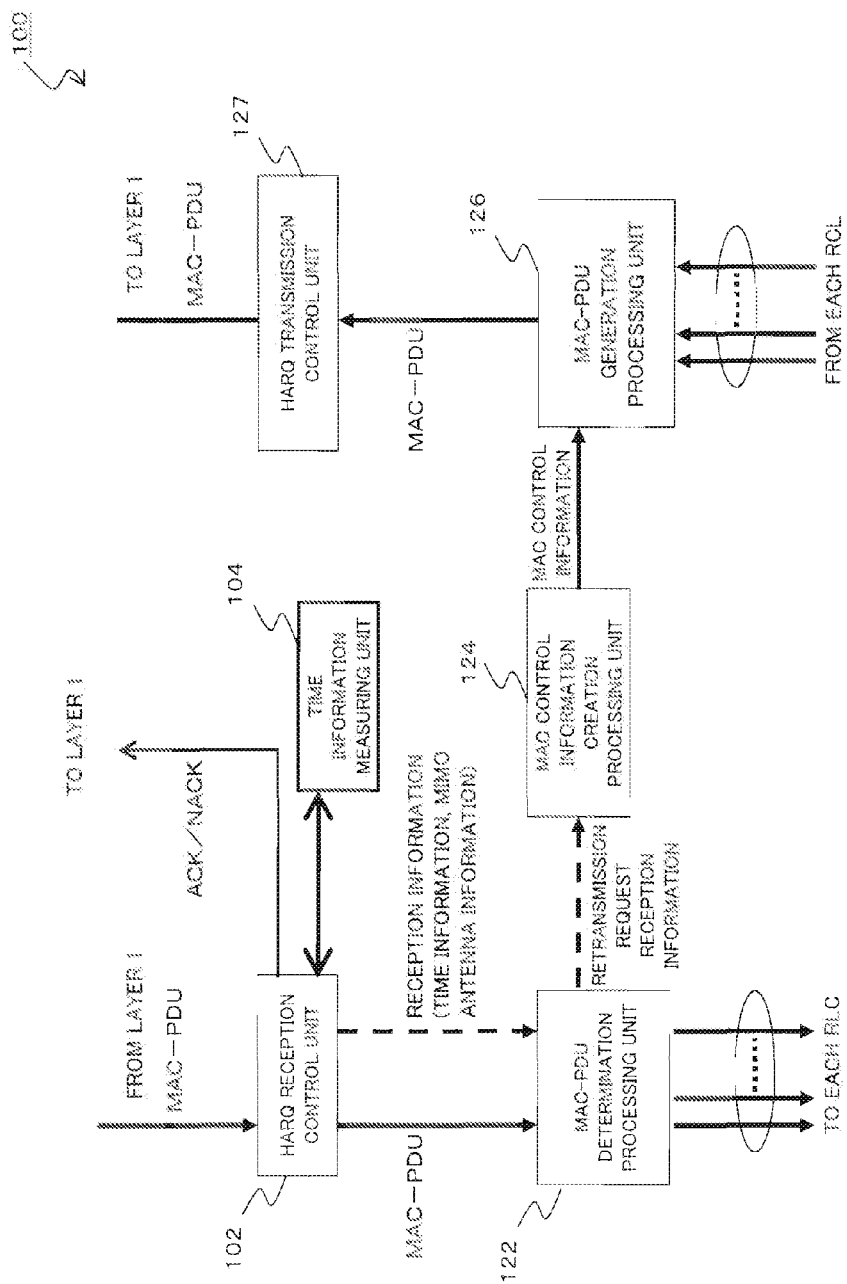
FIG. 7 is a view illustrating a substantial part of this embodiment.

FIG. 7 is a view illustrating a substantial part 100 of the wireless communication apparatus, and the substantial part is a portion corresponding to a MAC layer of a protocol construction of a layer 2 illustrated in FIG. 1. A layer 1 is provided on a subordinate position of the substantial part 100, and an RLC entity and a PDCP entity of the layer 2 are provided on a superior position of the substantial part 100. MAC-PDU, which is data received by the layer 1, is input to an HARQ reception control unit 102. The HARQ reception control unit 102 determines whether the MAC-PDU, which is the input data, is correct data or incorrect data. The HARQ reception control unit 102 issues a command to transmit ACK information to the layer 1 when the MAC-PDU is the correct data. The HARQ reception control unit 102 issues a command to transmit NACK information to the layer 1 when the MAC-PDU is the incorrect data. Thereby, an ACK signal or a NACK signal is transmitted to the layer 1. Herein, the HARQ reception control unit 102 determines that the MAC-PDU is the incorrect data and transmits the NACK information to the layer 1, and the HARQ reception control unit 102 also transmits a measurement start signal to a time information measuring unit 104.

Herein, the MAC-PDU, which is the data transmitted from a wireless communication apparatus on a transmitting side, and determination of correctness and incorrectness of the data are described with reference to FIGS. 8 and 9.

Figure 8:
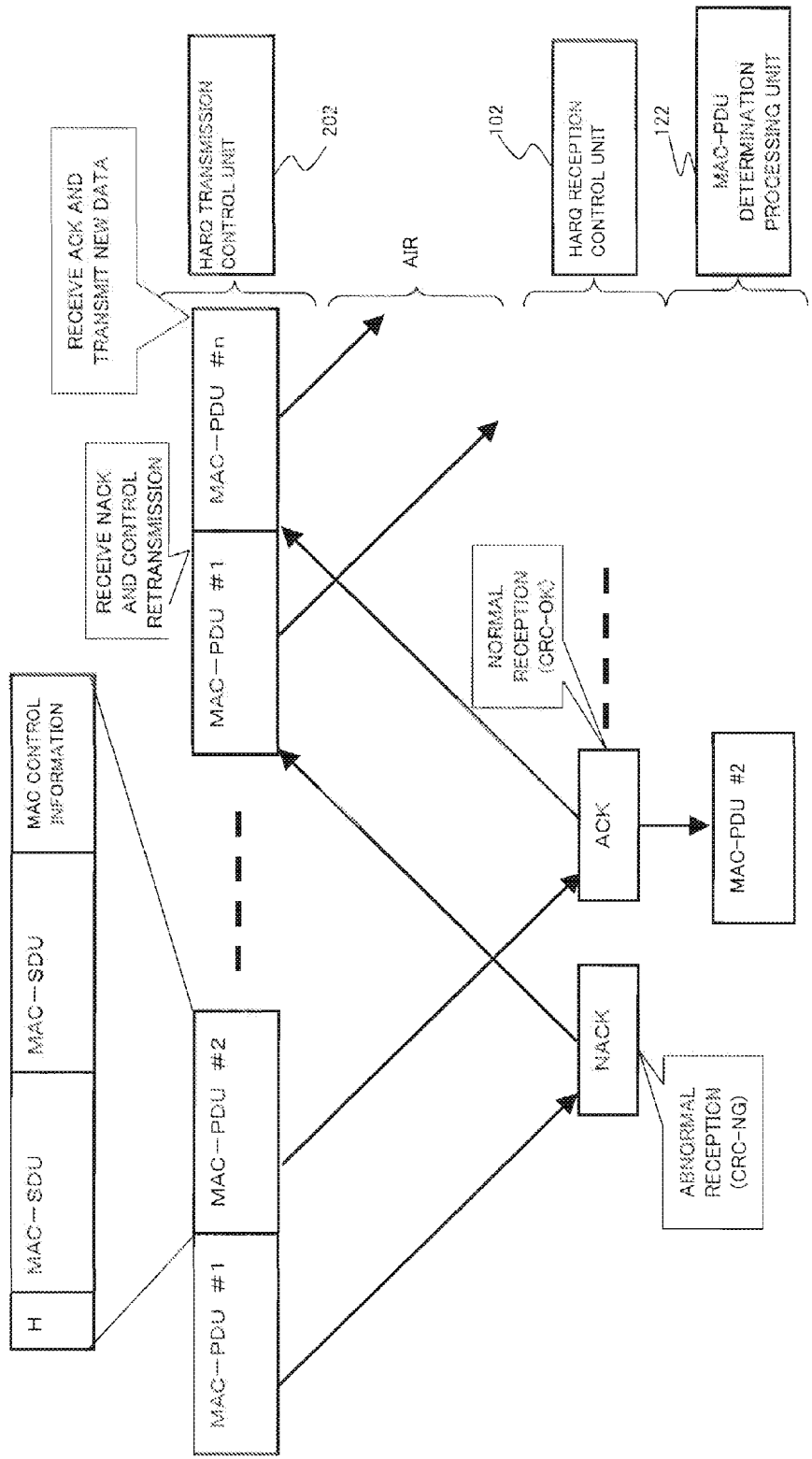
FIG. 8 is a view illustrating a normal process flow.

FIG. 8 is a view illustrating a data flow including reply of the ACK and the NACK by a receiving side HARQ. Herein, an HARQ transmission control unit 202 on a transmitting side operates to transmit two MAC-PDUs, which are a MAC-PDU #1 and a MAC-PDU #2, to a wireless communication apparatus on the receiving side. The two MAC-PDUs are received by the wireless communication apparatus on the receiving side, and the HARQ reception control unit 102 performs a CRC check for each received MAC-PDU. When it is assumed that result of the CRC check is that reception is abnormal (CRC-NG) for MAC-PDU #1, the NACK is transmitted to the wireless communication apparatus on the transmitting side through the layer 1, and the HARQ transmission control unit 202 performs a retransmission control of the same MAC-PDU #1 when the HARQ transmission control unit 202 receives the NACK. The wireless communication apparatus on the transmitting side manages the time at which the MAC-PDU #1 is transmitted, and when the NACK is received, the wireless communication apparatus on the transmitting side can recognize which MAC-PDU is requested to be retransmitted by the NACK request, from the received time of the NACK. Therefore, the wireless communication apparatus on the receiving side of the MAC-PDU transmits the NACK without transmitting an identifier of the MAC-PDU in which the abnormal reception occurs. Thereby, it is possible to know in which MAC-PDU the abnormal reception occurs in the wireless communication apparatus on the transmitting side of the MAC-PDU.

As for the MAC-PDU #2 transmitted next to the MAC-PDU #1 from the wireless communication apparatus on the transmitting side, when reception is normal (CRC-OK), the HARQ reception control unit 101 passes the MAC-PDU #2 to a MAC-PDU determination processing unit 122 and transmits the ACK to the wireless communication apparatus on the transmitting side through the layer 1. The wireless communication apparatus on the transmitting side, which receives the ACK, recognizes that the retransmission control is not required for the MAC-PDU #2, and transmits the MAC-PDU to be transmitted next (herein, MAC-PDU #n).

The MAC-PDU determination processing unit 122 determines whether the MAC-PDU #2 received from the HARQ reception control unit 102 is a correct format PDU or an incorrect format PDU.

Figure 9:
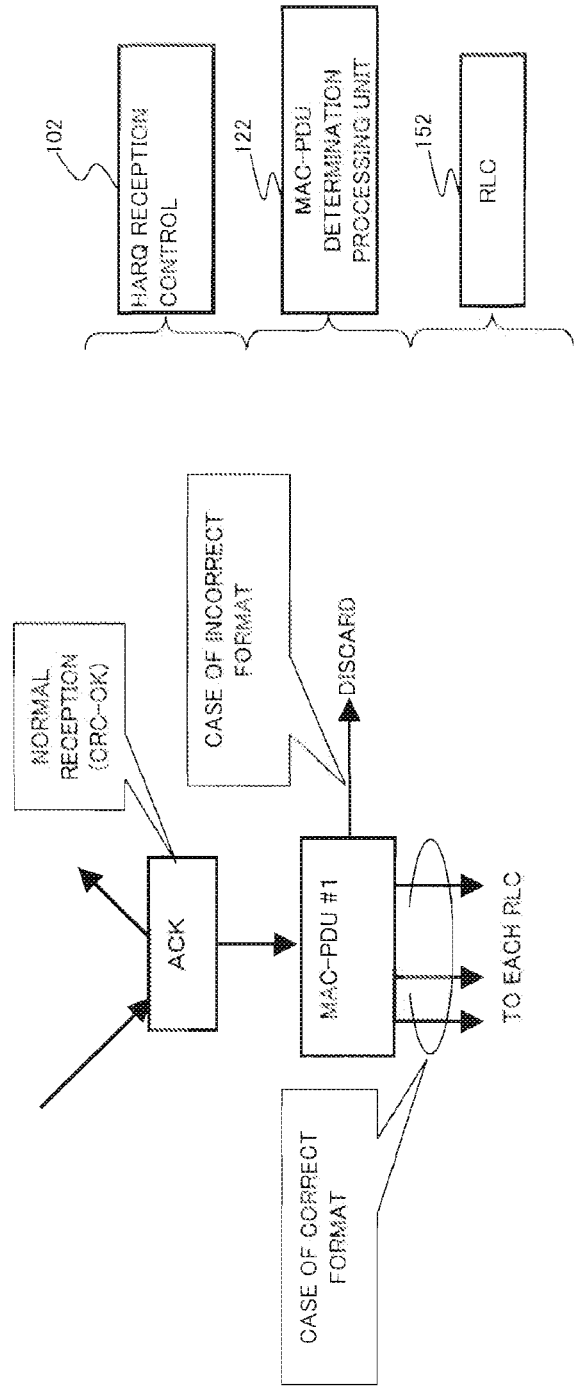
FIG. 9 is a view illustrating a process flow example of correctness and incorrectness determination of received data.

FIG. 9 is a schematic view illustrating a determination process of correctness/incorrectness of the PDU format in the MAC-PDU determination processing unit 122.

As described above, the HARQ reception control unit 102 transmits the ACK to the wireless communication apparatus on the transmitting side when it is determined that the reception is normal as a result of the CRC check, and passes the MAC-PDU to the MAC-PDU determination processing unit 122. When the MAC-PDU determination processing unit 122 receives the MAC-PDU from the HARQ reception control unit 102, the MAC-PDU determination processing unit 122 determines whether the format of the MAC-PDU is correct or incorrect. The incorrect format includes the following, for example:

(1) When an identifier of a LCH is out of range,
(2) when a header is larger than a prescribed size (E (Extension) flag in the header is ON),
(3) when a sum of Length information in the header is longer than the received MAC-PDU,
(4) when an identifier of MAC control information is out of range, and
(5) when the identifier of the MAC control information and the length are different from each other.

The MAC-PDU determination processing unit 122 determines whether the format of the MAC-PDU is correct or incorrect, and in the case of the correct format, the MAC-PDU is divided into MAC-SDUs for each LCH and passed to an RLC entity of each LCH (RLC 152 on the receiving side). However, in the case of the incorrect format, the MAC-PDU is discarded or a retransmission request is transmitted through a MAC control information creation processing unit 124, a MAC-PDU generation processing unit 126, and an HARQ transmission control unit 127, illustrated in FIG. 7.

In the above-described configuration, the HARQ reception control unit 102 determines whether the MAC-PDU, which is the data transmitted from the wireless communication apparatus on the transmitting side, is the correct data or the incorrect data. According to this determination, the ACK information and the NACK information (refer to an HARQ reception result signal of a PUCCH in FIGS. 2A and 2B) are transmitted to the wireless communication apparatus on the transmitting side through the layer 1 while the ACK information and the NACK information are protected by the CRC or the like.

The time information measuring unit 104 measures time course by setting a time at which the above-described NACK information is transmitted to the wireless communication apparatus on the transmitting side as a start time. When the MAC-PDU previously determined to be incorrect from the wireless communication apparatus on the transmitting side is received by the user terminal within a predetermined time period, and the HARQ reception control unit 102 determines that the MAC-PDU is the correct MAC-PDU, a reception finished signal, which indicates that the MAC-PDU is received, is input from the HARQ reception control unit 102, and then the measurement of an elapsed time by the time information measuring unit 104 is finished.

On the other hand, when the reception finished signal is not input from the HARQ reception control unit 102 to the time information measuring unit 104 within the predetermined time period, an unfinished signal, which indicates that the predetermined time has passed, is notified to the HARQ reception control unit 102 by the time information measuring unit 104, and the HARQ reception control unit 102 transmits the NACK signal again to the wireless communication apparatus on the transmitting side through the layer 1.

Figure 10:
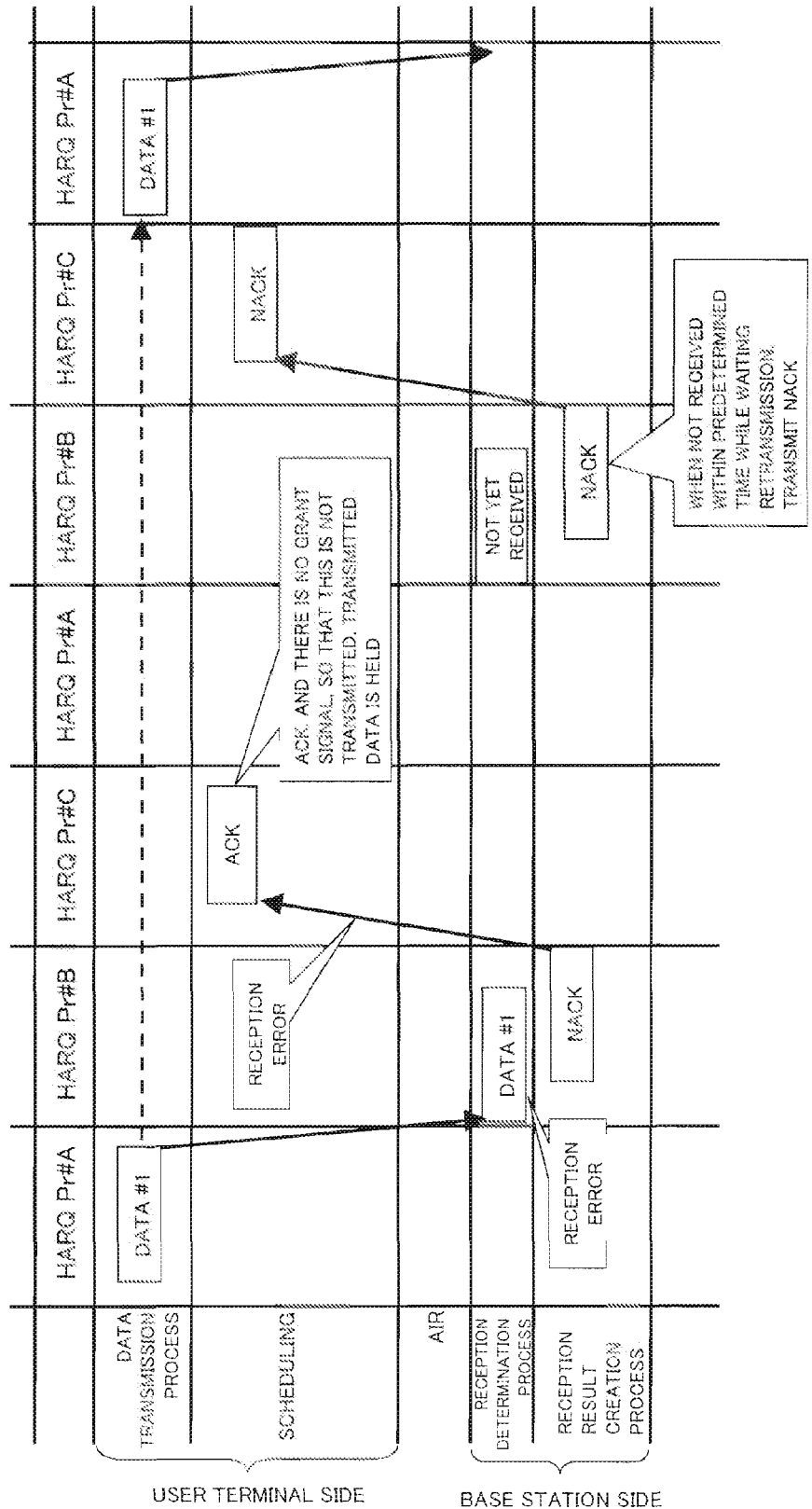
FIG. 10 is a view illustrating a process flow of the embodiment.

FIG. 10 illustrates a process flow in the wireless communication apparatus on the receiving side and the wireless communication apparatus on the transmitting side based on the above-described configuration. In FIG. 10, a data transmission process and a scheduling process indicate processes on the user terminal side, such as a portable phone, and a reception determination process and a reception result creation process indicate processes on the base station side, which is the receiving side.

Figure 6:
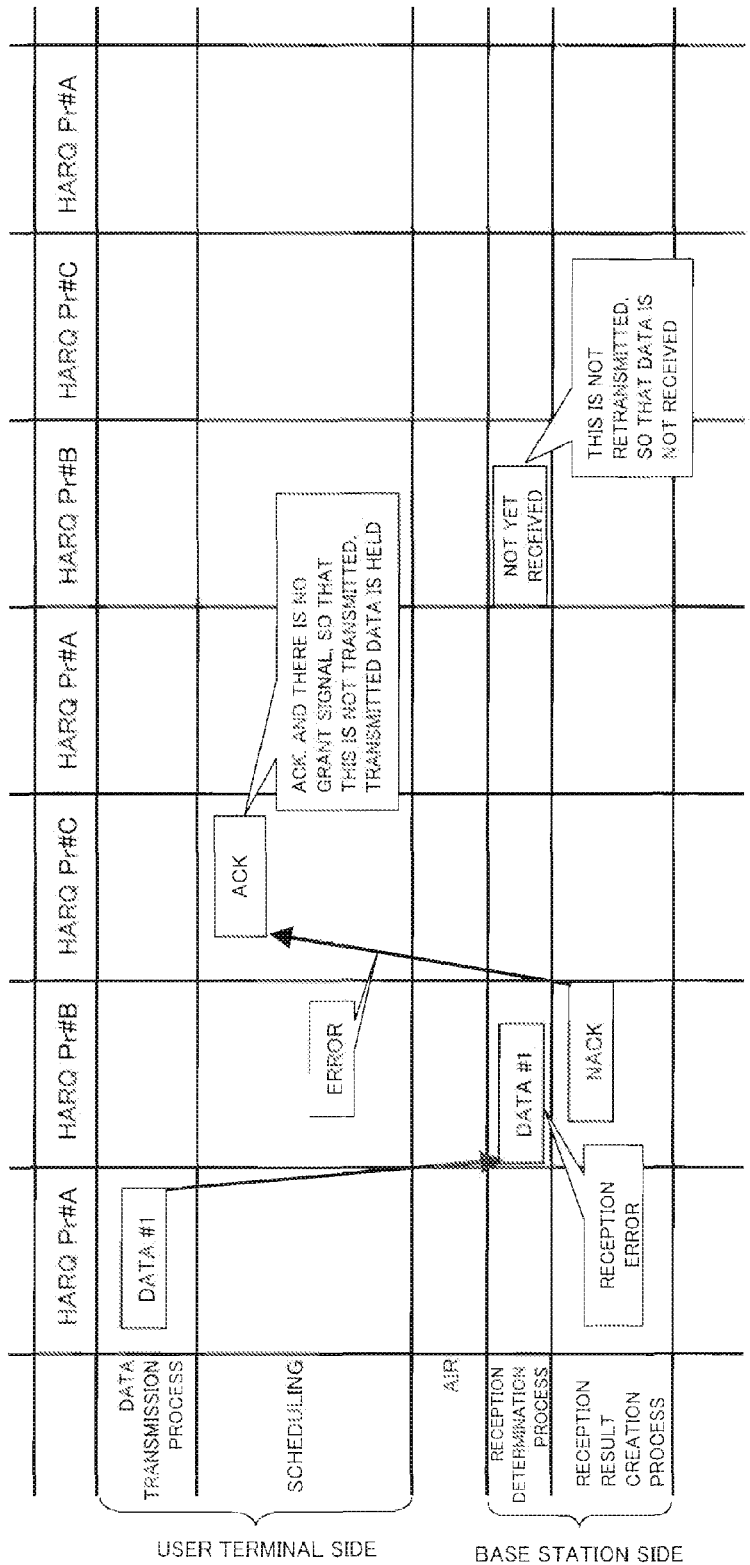
FIG. 6 is a view illustrating an example.

FIG. 10 is a view illustrating the process flow of this embodiment, and in this embodiment, the configuration of the substantial part 100 of this embodiment illustrated in FIG. 7 is provided on the base station side. Also, FIG. 10 illustrates an example in which data to be transmitted next to the data #1 is not present. FIG. 10 illustrates, as in the case illustrated in FIG. 6, a case in which reception error of the data #1 transmitted from the user terminal side occurs on the base station side, and when the NACK information is transmitted to the user terminal side, the NACK information changes to the ACK information during transmission, and is received by the user terminal side. Since the user terminal side receives the ACK information, the user terminal side does not perform the retransmission, and the data #1 is in a held state.

As described above, on the base station side, the measurement of the elapsed time from the transmission of the NACK information is started by the time information measuring unit 104 illustrated in FIG. 7, and after a predetermined time, the NACK information is transmitted to the user terminal side. When the NACK information is normally received by the user terminal side, the held data #1 is transmitted to the base station side. In this manner, even when the retransmission request signal is not protected by a check bit or the CRC, or even when the information of the retransmission request signal is changed during the transmission, it is possible to monitor the elapsed time from the transmission of the retransmission request signal and transmit the retransmission request signal again when desired data is not retransmitted after the predetermined time.

Furthermore, it becomes possible to prevent drop out of the data #1.

Figure 11:
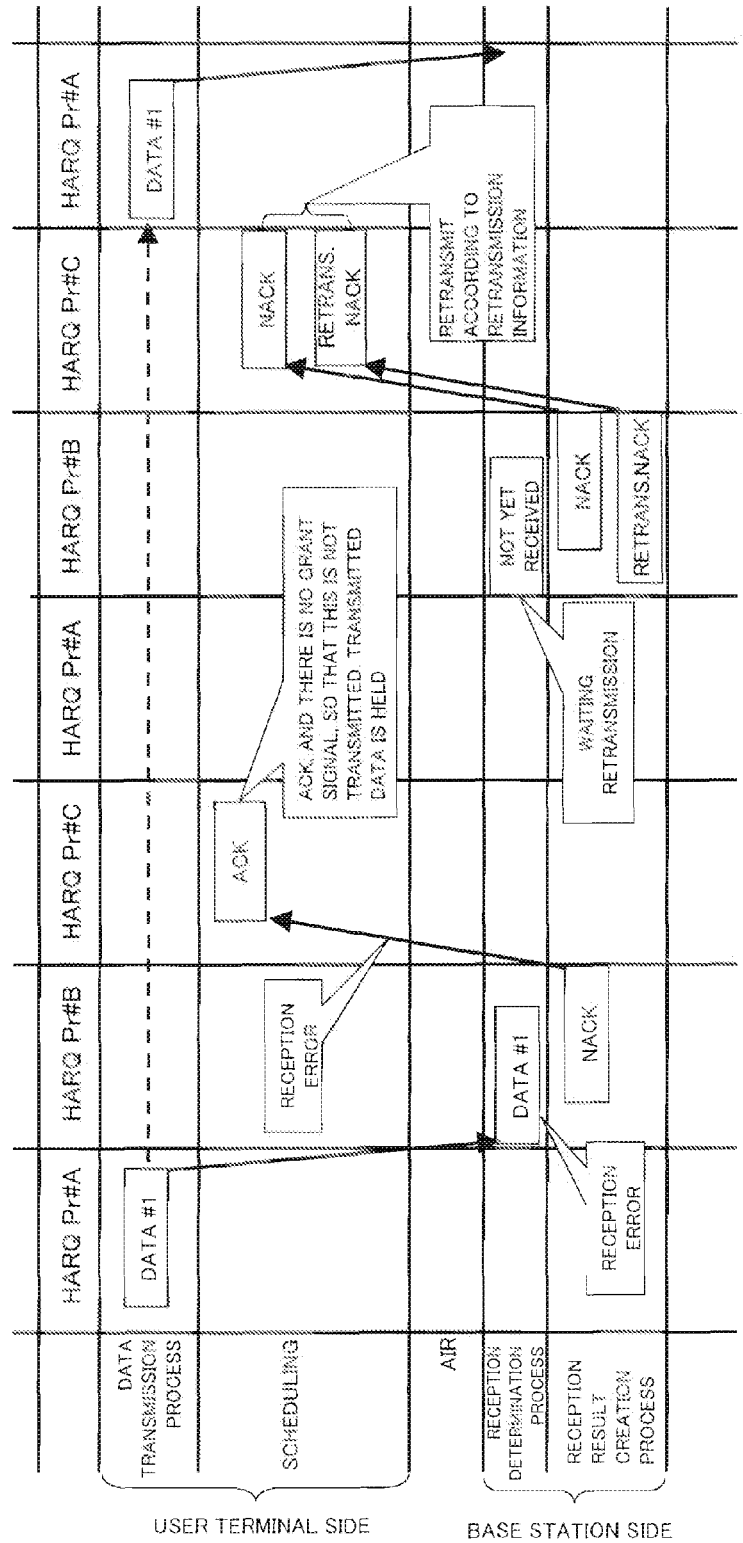
FIG. 11 is a view illustrating the process flow of the embodiment.

Also, as another embodiment, an example of simultaneously transmitting the signal protected by the CRC or the like, such as a transmission resource notifying signal including the retransmission information, and the NACK information is described with reference to FIG. 11. In FIG. 11, the data transmission process and the scheduling process indicate the processes on the user terminal side, such as the portable phone. The reception determination process and the reception result creation process are performed on the base station side. The transmission from the base station side is a downlink signal, and a transmission resource signal protected by the CRC or the like may be used. Therefore, in this embodiment, the retransmission request is performed by the NACK signal. As in FIG. 7, when the NACK signal is transmitted to the user terminal side by the time information measuring unit 104 provided in a MAC entity of the layer 2 on the base station side, and the MAC-PDU of which retransmission is requested is not received from the user terminal within the predetermined time period, the NACK information and the transmission resource signal including the retransmission information are transmitted to the user terminal side, thereby surely allowing the user terminal to perform retransmission. Meanwhile, although the NACK information is transmitted first in FIG. 11, it is possible that the transmission resource signal is transmitted first.

Although a case in which the substantial part 100 illustrated in FIG. 7 is provided on the base station side is illustrated in detail in the above FIGS. 10 and 11, it is possible to provide the configuration of the substantial part 100 on the user terminal side, thereby providing the effect similar to above-described ones.

Furthermore, it is possible to retransmit the PDU, which is conventionally dropped out due to difference in recognition between the transmission and reception of the reception result signal, by the HARQ process, thereby providing the retransmission processing method and the wireless communication apparatus capable of improving an entire throughput.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for retransmission data for a data transmission system in which a receiver transmits, when receiving data, a transmittal confirmation signal indicating whether the data is correctly received or not, and a transmitter refers to the transmittal confirmation signal and retransmits, when confirming that the data is not correctly received in the receiver, the data to the receiver, the method comprising:

holding, by the transmitter, the transmitted data;

keeping, by the transmitter, the holding of the transmitted data even after the transmitter confirms that the data is correctly received in the receiver by referring to the transmittal confirmation signal corresponding to the data;

transmitting, by the receiver to the transmitter, the transmittal confirmation signal indicating that the transmitted data is not correctly received, the transmittal confirmation signal not protected by Cyclic Redundancy Check (CRC);

transmitting, by the receiver to the transmitter, a request for retransmission of the data along with the transmittal confirmation signal indicating that the transmitted data is not correctly received when the receiver cannot receive the data transmitted from the transmitter within a certain time period after the transmission of the transmittal confirmation signal indicating that the data is not correctly received, the request being protected by Cyclic Redundancy Check (CRC) and the transmittal confirmation signal being not protected by Cyclic Redundancy Check (CRC); and retransmitting, by the transmitter, the data depending on the transmittal confirmation signal, in response to the request for retransmission of the data from the receiver.

* * * * *